UNITED STATES PATENT OFFICE.

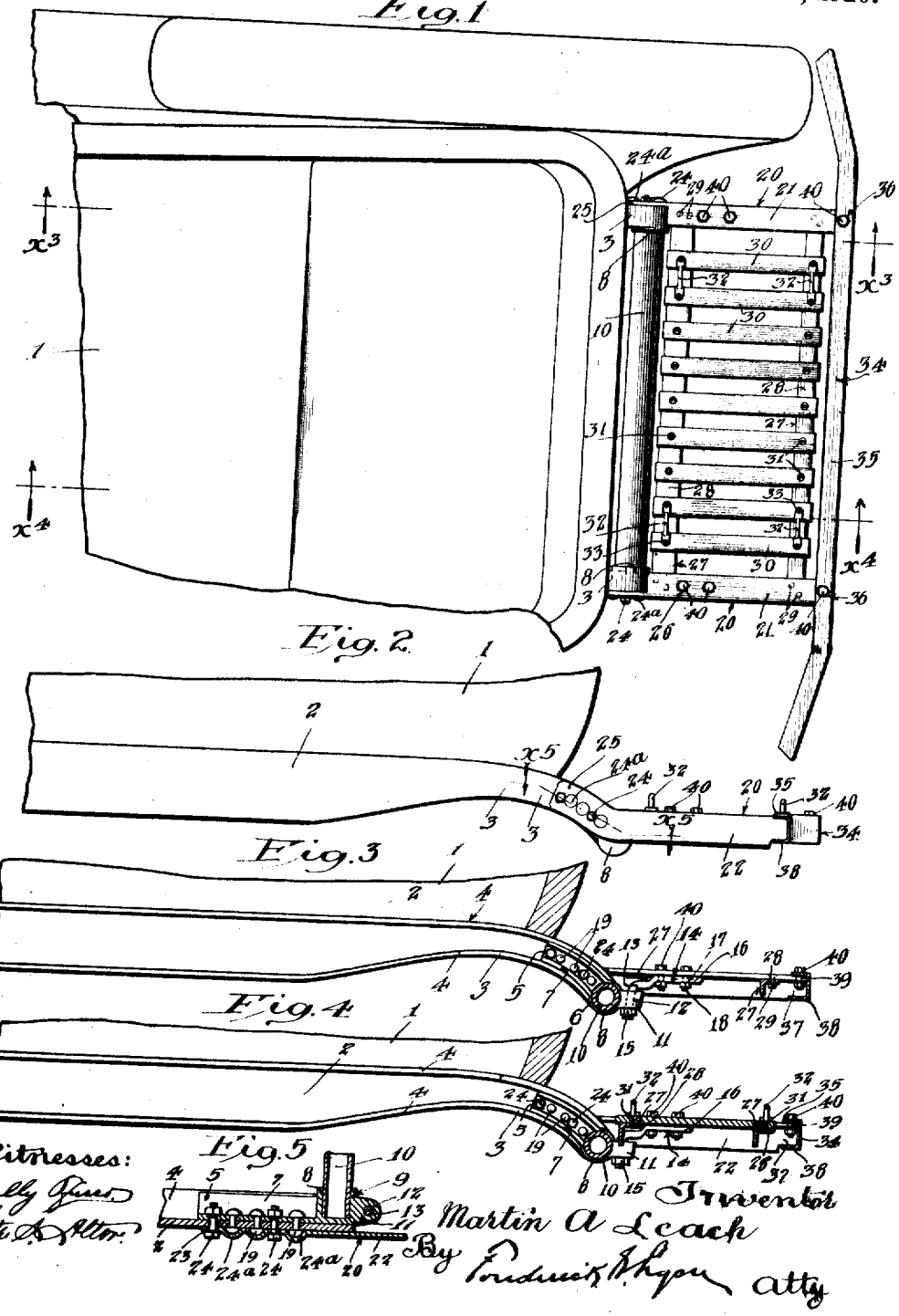

MARTIN ANDREW LEACH, OF LOS ANGELES, CALIFORNIA.

ATTACHMENT FOR AUTOMOBILES.

1,337,522.   Specification of Letters Patent.   Patented Apr. 20, 1920.

Application filed March 11, 1919. Serial No. 281,992.

*To all whom it may concern:*

Be it known that I, MARTIN A. LEACH, a citizen of the United States, residing at Los Angeles, in the county of Los Angeles and State of California, have invented a new and useful Attachment for Automobiles, of which the following is a specification.

This invention relates to an attachment for vehicles and in particular is a combined trunk rack and bumper adapted to be secured to the frame of an automobile.

An object of this invention is to provide a device which will serve as a rack for trunks or luggage and which will also operate as a bumper or fender for automobiles.

Another object of this invention is to provide a device of this nature which will be adaptable as a carrier for a trunk or other luggage and which will be provided with a guard, which guard will serve as a protective means for both the trunk or luggage and the automobile to which the device may be secured.

Another object of this invention is to provide a device of this nature which will be economical to manufacture, durable and positive in action, and readily adaptable to an automobile of the customary design.

The accompanying drawings illustrate the invention.

Figure 1 is a plan view of the attachment as applied to the rear end of an automobile, the automobile being shown fragmentarily.

Fig. 2 is a side elevation of the same showing a portion only of the automobile proper.

Fig. 3 is a vertical section taken on the line indicated by $x^3$—$x^3$ in Fig. 1.

Fig. 4 is a vertical section taken on the line indicated by $x^4$—$x^4$ in Fig. 1.

Fig. 5 is a detail section taken on the line indicated by $x^5$—$x^5$ in Fig. 2.

Referring to the drawings there is illustrated, fragmentarily at 1, an automobile. The automobile is constructed with the customary longitudinal channel frame members 2. The particular channel frame members illustrated in the drawings are formed with rearwardly and downwardly projecting portions 3. There is received within the sides 4 of the channel members 2 arms 5 of hangers 6. The arms 5 are preferably formed in a U-shaped section and of such size that their sides 7 are readily received between the sides 4 of the channel members 2. The arms 5 are upwardly curved to register with the curve of the projecting portions 3 of the channel members 2.

At their lower extremities the arms 5 are provided with bearings 8, which bearings 8 are apertured at 9 to receive a transverse supporting bar 10. The transverse supporting bar 10 may be secured within said bearings 9 in any desired and suitable manner.

The hangers 6 are provided with bosses 11 which extend from and are cast integral with the bearings 8. The bosses 11 are apertured at 12 to receive the lower leg 13 of right angle brackets 14. The lower legs 13 of the brackets 14 are threaded to receive lock nuts 15. The upper legs 16 of the right angle brackets 14 are apertured at 17 to receive bolts 18. The hangers 6 are provided with apertures formed in the arms 5. The downwardly projecting portions 3 of the channel members are formed with registering apertures to receive rivets 19 which secure the hangers 6 to the channel members 2.

Mounted upon the upper legs 6 of the right angle brackets 14, and extending rearwardly from the automobile 1, there are provided side bars 20. These side bars 20 are preferably formed of angle iron having horizontal legs 21 and vertical legs 22. The vertical legs 22 of the side bars 20 are apertured at 23, which apertures 23 register with the corresponding apertures formed in the arms 5 and channel members 2. Securing means 24 are adapted to pass through the apertures 23 and secure the side bars 20 to the channel members 2. The horizontal legs 21 of the side bars 20 are cut away at their inner ends to receive the bearings 8. The side bars 20 are in this manner adapted to engage and surround on two surfaces the bearings 8, the vertical legs 22 of the side bars 20 extending over and engaging the outer vertical faces of the bearings 8. In practice it is found preferable to stamp depressions 24ª in the vertical legs 22 so spaced that they register with the heads of the rivets 19 which secure the hangers 6 to the channel members 2. In this manner the vertical legs 22 closely engage the downwardly projecting portions 3 of the channel members 2 and the rivet heads 20 are receivable within the depressions 24ª. The inner ends of the side bars 20 are formed with upwardly projecting portions 25 to correspond with the downwardly projecting portions 3 of the channel members 2. The horizontal legs 21 are apertured at 26 to register with apertures 17 formed in the brackets 14 and receive the bolts 40 to secure the side bars 20 to the brackets 14. The above described connections for attaching the rack to the automobile frame may be varied to meet any construction of automobile frame.

Extending between the side bars 20 there are provided two transverse supports 27, which supports are spaced to form with the side bars 20 the frame of a rack or carrier. The transverse supports 27 are preferably formed of angle iron, the horizontal legs 28 of which are secured at their ends to the side bars 20 by suitable means 29. Slats 30 are placed at spaced intervals upon the horizontal legs 28 and are secured to the horizontal legs 28 by suitable means 31. The slats 30, the transverse supports 27, and the side bars 20 form a platform for luggage or trunks, etc. The said platform is provided with a plurality of strap holders 32, which strap holders are preferably secured at 33 to the slats 30.

There is provided a bumper rod 34 which may be formed of the usual channel construction as illustrated, the upper wall 35 of which is apertured at 36. The outer ends of the vertical legs 22 of the side bars 20 are reduced at 37 to receive the lower wall 38 of the bumper rod 34. In this manner the side bars 20 are received within the channel of the bumper rod and the horizontal legs 21 of the side bars 20 are apertured at 39 to register with the apertures 36 of the bumper rod. Suitable means 40 are received within the apertures 36 and 39 to secure the bumper rod 34 to the side bars 20.

I have heretofore set forth the preferred construction of my combined trunk rack and bumper, but my invention is not limited to these details of construction and is of the full scope set forth in the appended claims.

I claim:

1. An attachment for automobiles comprising a luggage supporting platform and a bumper rod rigidly secured to said supporting platform.

2. An attachment for automobiles comprising side bars secured at their forward ends to an automobile, transverse supports spaced between said side bars and secured thereto, slats mounted at spaced intervals upon said transverse supports, and a bumper rod secured to said side bars.

3. An attachment for automobiles comprising hangers secured to the frame of an automobile, bracket members carried by said hangers, side bars secured to said bracket members and to the frame of said automobile, a luggage supporting platform carried by said side bars, and a bumper rod secured to the rear ends of said side bars.

4. An attachment for automobiles comprising side bars secured at their forward ends to the rear of an automobile, transverse supports spaced between said side bars and secured thereto, slats secured at their ends to said transverse supports, and a bumper bar supported by said side bars.

Signed at Los Angeles, California this 6th day of March 1919.

MARTIN ANDREW LEACH

Witnesses:
C. NEWTON GRAVES,
VERNON W. BALZER.